United States Patent
Bolin et al.

(10) Patent No.: US 10,969,481 B2
(45) Date of Patent: Apr. 6, 2021

(54) COEXISTENCE OF RADIO COMMUNICATION AND RADAR PROBING

(71) Applicant: Sony Mobile Communications Inc., Tokyo (JP)

(72) Inventors: Thomas Bolin, Lund (SE); Zhinong Ying, Lund (SE); Peter C. Karlsson, Lund (SE); Erik Bengtsson, Eslov (SE)

(73) Assignee: Sony Corporation, Tokyo (JP)

( * ) Notice: Subject to any disclaimer, the term of this patent is extended or adjusted under 35 U.S.C. 154(b) by 189 days.

(21) Appl. No.: 16/305,939

(22) PCT Filed: Jun. 1, 2016

(86) PCT No.: PCT/EP2016/062339
§ 371 (c)(1),
(2) Date: Nov. 30, 2018

(87) PCT Pub. No.: WO2017/207042
PCT Pub. Date: Dec. 7, 2017

(65) Prior Publication Data
US 2019/0293781 A1   Sep. 26, 2019

(51) Int. Cl.
*G01S 13/86* (2006.01)
*G01S 7/00* (2006.01)
*G01S 7/02* (2006.01)
*H04K 3/00* (2006.01)

(52) U.S. Cl.
CPC .............. *G01S 13/86* (2013.01); *G01S 7/006* (2013.01); *G01S 7/023* (2013.01); *H04K 3/20* (2013.01); *H04K 3/226* (2013.01); *H04K 3/82* (2013.01); *H04K 3/28* (2013.01); *H04K 2203/16* (2013.01); *H04K 2203/22* (2013.01)

(58) Field of Classification Search
CPC combination set(s) only.
See application file for complete search history.

(56) References Cited

U.S. PATENT DOCUMENTS

| | | | |
|---|---|---|---|
| 9,743,285 B2* | 8/2017 | Picker | ................... H04W 16/14 |
| 10,142,082 B1* | 11/2018 | Shattil | ................. H04L 27/2602 |
| 2007/0096885 A1 | 5/2007 | Cheng | |
| 2012/0143397 A1 | 6/2012 | Mackay et al. | |
| 2014/0035774 A1 | 2/2014 | Khlifi | |

(Continued)

FOREIGN PATENT DOCUMENTS

| | | |
|---|---|---|
| DE | 102009054776 A1 | 8/2010 |
| EP | 2693230 A1 | 2/2014 |

(Continued)

OTHER PUBLICATIONS

International Search Report and Written Opinion from counterpart International Patent Application No. PCT/EP2016/062339 dated Feb. 21, 2017, 13 pages.

(Continued)

*Primary Examiner* — Mamadou L Diallo
(74) *Attorney, Agent, or Firm* — Tucker Ellis LLP

(57) ABSTRACT

A device (112, 130) is configured to communicate data (108) on a radio channel (101, 105, 106) employing first resource elements. The device (112, 130) is further configured to participate in a radar probing (109) employing second resource elements which are orthogonal to the first resource elements.

17 Claims, 8 Drawing Sheets

(56) References Cited

U.S. PATENT DOCUMENTS

| | | | | |
|---|---|---|---|---|
| 2015/0270882 | A1* | 9/2015 | Shattil | H04B 7/0452 |
| | | | | 370/329 |
| 2017/0251484 | A1* | 8/2017 | Negus | H04L 5/14 |
| 2018/0042018 | A1* | 2/2018 | Bhushan | H04W 72/046 |
| 2019/0268117 | A1* | 8/2019 | Nilsson | H04B 7/0695 |
| 2019/0289588 | A1* | 9/2019 | Akkarakaran | H04B 7/088 |
| 2019/0364492 | A1* | 11/2019 | Azizi | H04W 4/029 |
| 2020/0212986 | A1* | 7/2020 | Nilsson | H04B 7/0894 |

FOREIGN PATENT DOCUMENTS

| | | | |
|---|---|---|---|
| GB | 2428921 | A | 2/2007 |
| JP | 2012054799 | A | 3/2012 |
| WO | 2014125447 | A1 | 8/2014 |

OTHER PUBLICATIONS

Notice of Rejection from corresponding Japanese Application No. 2018-562287, dated Feb. 18, 2020, 5 pages.

\* cited by examiner

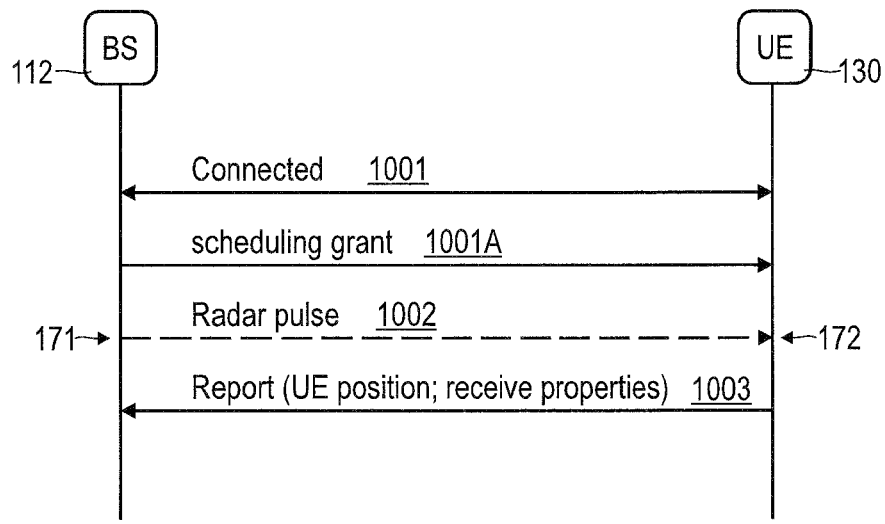
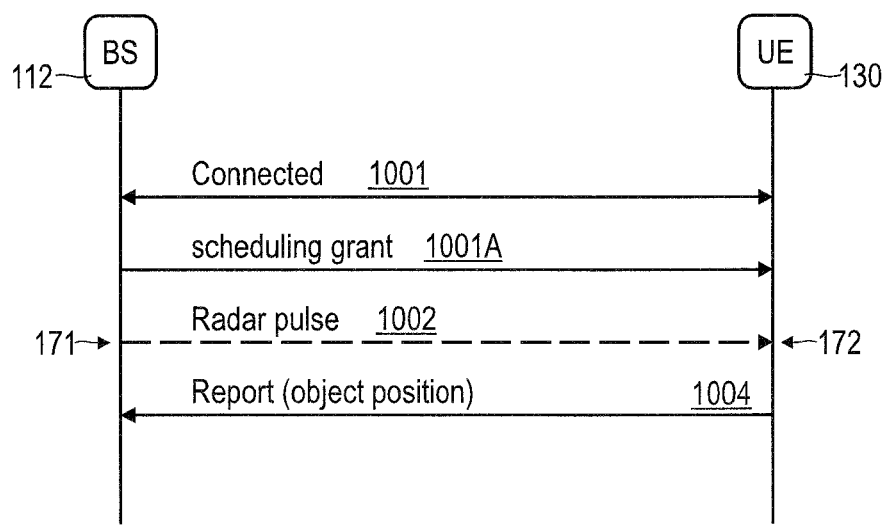

COEXISTENCE OF RADIO COMMUNICATION AND RADAR PROBING

TECHNICAL FIELD

Various examples relate to a device comprising a radio transceiver and at least one processor configured to communicate, via the radio transceiver, data on the radio channel. The at least one processor is further configured to control the radio transceiver to participate in a radar probing. Orthogonal resource elements are employed for the radar probing and the data communication, respectively. Further examples relate to a corresponding method.

BACKGROUND

For achieving higher data bandwidth, spectra used for communication on radio channels are expected to move to higher frequencies, e.g., to frequencies beyond 6 or 10 GHz.

At such frequencies, radar probing is feasible. This is due to the well-defined spatial transmission characteristics of electromagnetic waves in the respective spectrum.

However, with data communication and radar probing coexisting in the same spectrum, interference can reduce a transmission reliability of the data communication and/or an accuracy of the radar probing.

SUMMARY

Therefore, a need exists for advanced techniques of coexistence of data communication and radar probing. In particular, a need exists for techniques which mitigate interference between data communication and radar probing.

This need is met by the features of the independent claims. The features of the dependent claims define embodiments.

According to an example, a device comprises a radio transceiver and at least one processor. The at least one processor is configured to communicate, via the radio transceiver, data on a radio channel employing first resource elements of the radio channel. The at least one processor is further configured to control the radio transceiver to participate in a radar probing employing second resource elements of the radio channel. The second resource elements are orthogonal to the first resource elements.

According to an example, a method comprises communicating data on a radio channel employing first resource elements of the radio channel. The method further comprises participating in a radar probing employing second resource elements of the radio channel. The second resource elements are orthogonal to the first resource elements.

According to an example, a computer program product is provided which comprises control instructions that can be executed by at least one processor. Executing the control instructions causes the at least one processor to perform a method. The method comprises communicating data on a radio channel employing first resource elements of the radio channel. The method further comprises participating in a radar probing employing second resource elements of the radio channel. The second resource elements are orthogonal to the first resource elements.

The examples described above and the examples described hereinafter may be combined with each other and further examples.

BRIEF DESCRIPTION OF THE DRAWINGS

FIG. 5A is a signaling diagram for devices connected to a cellular network participating in a radar probing according to various embodiments.

FIG. 5B is a signaling diagram for devices connected to a cellular network participating in a radar probing according to various embodiments.

DETAILED DESCRIPTION OF PREFERRED EMBODIMENTS

Figure 1:
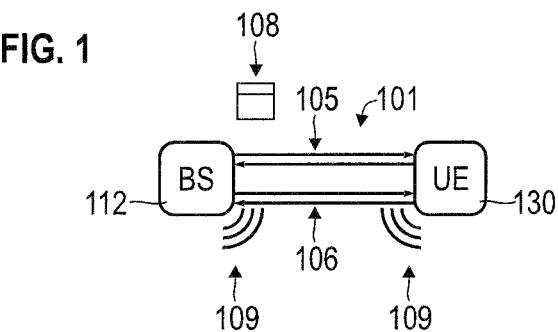
FIG. 1 schematically illustrates coexistence of data communication and radar probing according to various embodiments.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of coexistence of data communication and radar probing on a radio channel are described. To facilitate the coexistence, one or more resource mappings may be employed to coordinate and distribute resource-usage between the data communication and the radar probing. The one or more resource mappings may define resource elements with respect to one or more of the following: frequency dimension; time dimension; spatial dimension; and code dimension. Sometimes, the resource elements are also referred to as resource blocks.

Resource elements may thus have a well-defined duration in time domain and/or bandwidth in frequency domain. The resource elements may be, alternatively or additionally, defined with respect to a certain coding and/or modulation scheme. A given resource mapping may be defined with respect to a certain spatial application area or cell.

In some examples, resource elements of the resource mapping are employed for the data communication and the radar probing, respectively, which are orthogonal to each other. Here, orthogonality of resource elements may correspond to the resource elements differing from each other with respect to one or more of the following: frequency dimension; time dimension; spatial dimension; and code dimension. Sometimes, these cases are referred to frequency division duplexing (FDD), time division duplexing (TDD), spatial division duplexing; and code division duplexing (CDD).

By employing orthogonal resource elements for the data communication on the one hand side and the radar probing on the other hand side, interference between the data communication and the radar probing can be mitigated. Furthermore, it becomes possible to employ one and the same hardware, e.g., a handheld device or a radio base station to perform, both, data communication and radar probing.

By employing the radar probing in the context of a device configured for data communication, functionality of that device can be greatly enhanced. Examples include: positioning aid, traffic detection, drone landing assistance, obstacle detection, security detection, photography features, etc.

Now referring to FIG. 1, an example scenario of coexistence between radar probing 109 and data communication 108—such as packetized data communication—is depicted. Here, the base station (BS) 112 of a cellular network (in FIG. 1, the cells of the cellular network are not illustrated) implements the data communication 108 with the terminal 130 attached to the cellular network via a radio channel 101. Communicating data may comprise transmitting data and/or receiving data. In the example of FIG. 1, the data communication 108 is illustrated as bidirectional, i.e. comprising uplink (UL) communication and downlink (DL) communication.

E.g., the terminal 130 may be selected from the group comprising: handheld device; mobile device; robotic device; smartphone; laptop; drone; tablet computer; etc.

The data communication 108 may be defined with respect to a radio access technology (RAT). The RAT may comprise a transmission protocol stack in layer structure. E.g., the transmission protocol stack may comprise a physical layer (Layer 1), a datalink layer (Layer 2), etc. Here, a set of rules may be defined with respect to the various layers which rules facilitate the data communication. E.g., the Layer 1 may define transmission blocks for the data communication 108 and pilot signals.

While with respect to FIG. 1 and the following FIGs., various examples are provided with respect to a cellular network, in other examples, respective techniques may be readily applied to point-to-point networks. Examples of cellular networks include the Third Generation Partnership Project (3GPP)—defined networks such as 3G, 4G and upcoming 5G. Examples of point-to-point networks include Institute of Electrical and Electronics Engineers (IEEE)—defined networks such as the 802.11x Wi-Fi protocol or the Bluetooth protocol. As can be seen, various RATs can be employed according to various examples.

The data communication 108 is supported by, both, the BS 112, as well as the terminal 130. The data communication 108 employs a shared channel 105 implemented on the radio channel 101. The shared channel 106 comprises an UL shared channel and a DL shared channel. The data communication 108 may be used in order to perform uplink and/or downlink communication of application-layer user data between the BS 112 and the terminal 130.

As illustrated in FIG. 1, furthermore, a control channel 106 is implemented on the radio channel 101. Also, the control channel 106 is bidirectional and comprises an UL control channel and a DL control channel. The control channel 106 can be employed to implement communication of control messages. E.g., the control messages can allow to set up transmission properties of the radio channel 101.

Both, performance of the shared channel 105, as well as performance of the control channel 106 are monitored based on pilot signals. The pilot signals, sometimes also referred to as reference signals or sounding signals, can be used in order to determine the transmission characteristics of the radio channel 101. In detail, the pilot signals can be employed in order to perform at least one of channel sensing and link adaptation. Channel sensing can enable determining the transmission characteristics such as likelihood of data loss, bit error rate, multipath errors, etc. of the radio channel 101. Link adaptation can comprise setting transmission properties of the radio channel 101 such as modulation scheme, bit loading, coding scheme, etc. The pilot signals may be cell-specific.

The radar probing 109 can be used in order to determine the position and/or velocity of passive objects in the vicinity of the BS 112 and/or the terminal 130. It is possible that the position of the passive objects is determined in terms of a distance to the radar transmitter. Alternatively or additionally, it is possible that the position is more accurately determined, e.g., with respect to a reference frame. Radial and/or tangential velocity may be determined. For this, one or more receive properties of echoes of the radar probe pulses can be employed as part of the radar probing. Echoes are typically not transmitted along a straight line, hereinafter for simplicity referred to as non line-of-sight (LOS), but affected by reflection at the surface of an object. The receive properties may be locally processed at the radar receiver; and/or may be provided to a further entity such as the radar transmitter for processing to yield the position and/or the velocity.

As illustrated in FIG. 1, also the radar probing 109 is supported by, both, the BS 112, as well as the terminal 130. Thus, data communication 108 and radar probing 109 coexists in the hardware of the BS 112 and the terminal 130.

Here, it is possible that the BS 112 implements the radar transmitter and/or the radar receiver. Likewise, it is possible that the terminal 130 implements the radar transmitter and/or the radar receiver. The radar transmitter is configured to transmit radar probe pulses. Likewise, the radar receiver is configured to receive echoes of radar probe pulses reflected from passive objects.

In a first example, radar probe pulses are transmitted by the BS 112 and corresponding echoes are received by the BS 112. In a second example, radar probe pulses are transmitted by the BS 112 and corresponding echoes are received by the terminal 130. In a third example, radar probe pulses are transmitted by the terminal 130 and corresponding echoes are received by the terminal 130. In a fourth example, radar probe pulses are transmitted by the terminal 130 and corresponding echoes are received by the BS 112.

While with respect to FIG. 1 a two-device scenario is illustrated, in further examples, it is possible that more than two devices participate in the radar probing 109 as radar transmitters and/or radar receivers, respectively. E.g., further terminals connected to the cellular network (not shown in FIG. 1) may participate in the radar probing 109.

Generally, the techniques described herein may be implemented on the various devices of the network such as the BS 112 or one or more terminals 130 of the network.

Figure 2:
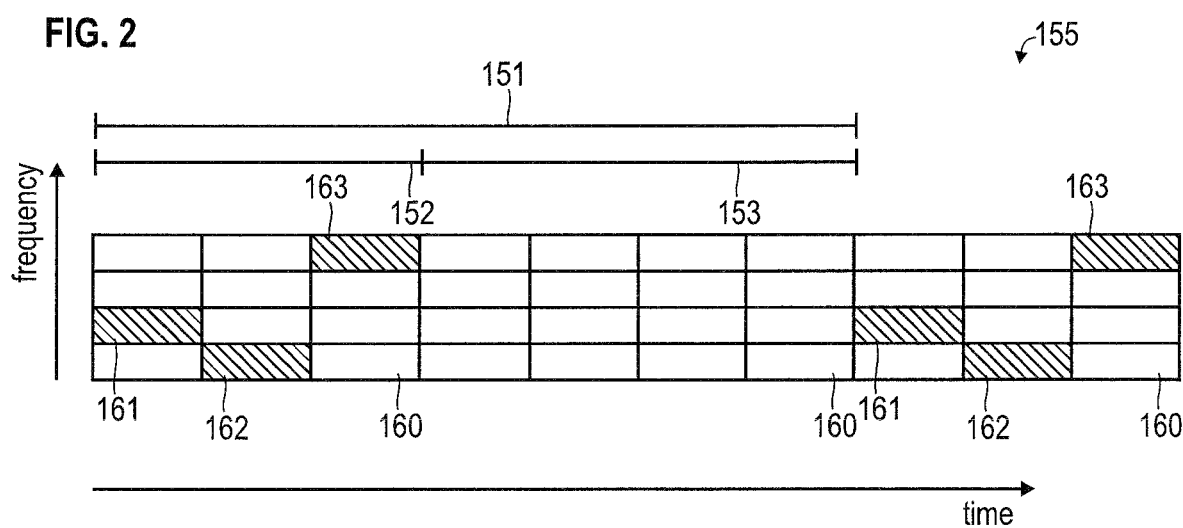
FIG. 2 schematically illustrates a resource mapping of a radio channel employed for the data communication according to various embodiments, the resource mapping comprising first resource elements employed for the data communication and second resource elements employed for the radar probing.

FIG. 2 illustrates aspects with respect to the resource mapping 155. As illustrated in FIG. 2, the resource mapping 155 is defined in frequency domain (vertical axis in FIG. 2) and time domain (horizontal axis in FIG. 2). The rectangular blocks in FIG. 2 illustrates different resource elements. First resource elements 160 are used for data communication. Second resource elements 161-163 are used for radar probing 109. As illustrated in FIG. 2, FDD and TDD techniques are employed to ensure that the first resource elements 160 and the second resource elements 161-163 are orthogonal with respect to each other. Data transmission 108 is muted, i.e., turned off or suppressed, during the second resource elements 161-163. By designing the first resource elements 160 and the second resource elements 161-163 to be orthogonal with respect to each other, interference between the data communication 108 in the first resource elements 160 and the radar probing 109 in the second resource elements 161-163 can be mitigated. By muting the data communication 109 in the second resource elements 161-163, degraded transmission reliability of the data communication 109 can be avoided.

In the example of FIG. 2, the resource elements 161-163 have a comparably limited frequency bandwidth. In some examples, it is possible to implement the radar probing 109 covering multiple resource elements 161-163 of the resource mapping 155 which hare adjacent to each other in frequency domain. It is possible that the full frequency bandwidth of the resource mapping 155 is dedicated to radar probing 109.

Illustrated in FIG. 2 is an example where the second resource elements 161-163 are arranged in an intermittent sequence. A repetition rate or periodicity 151 of the sequence of second resource elements 161-163 comprises a time duration 152 during which the second resource elements 161-163 are allocated in order to facilitate the radar probing 109; and further comprises a time duration 153 during which the second resource elements 161-163 are not present or muted (in FIG. 2 for sake of simplicity only a single repetition of the sequence of second resource elements 161-163 is fully depicted).

In one example, the average repetition rate of individual elements of the sequence of the second resource elements, e.g., the periodicity 151 is larger than 0.5 seconds, preferably larger than 0.8 seconds. By such a repetition rate, a sufficiently large time resolution can be provided for the radar probing 109 on the one hand side; while throughput of the data communication 108 is not unduly reduced.

In order to facilitate efficient radar probing 109, the duration 152 of individual elements of the sequence of the second resource elements 161-163 is typically shorter than 2 microsecond, preferably shorter than 0.8 microseconds, more preferably shorter than 0.1 microsecond. Thereby, significant snapshots of the position/velocity of the passive objects in the surrounding of the devices 112, 130 can be obtained; at the same time, resources are not unduly occupied. Considering a scenario where the distance is d=50 m, the time of flight for a radar probe pulse amounts to $2*d/c=100/(3*10^8)=0.33$ µs, where c is the speed of light. By dimensioning the second resource elements 161-163 to include multiple radar probe pulses, scanning is possible.

In some examples, it is possible that the duration of the resource elements 161-163 used for radar probing is different from the duration of the resource elements 160 used for data transmission. Generally, the time-frequency shape of the resource elements 161-163 may be different from the shape of the resource elements 160.

Generally, the techniques described herein are not limited to a particular spectrum or band. E.g., the spectrum occupied by the resource mapping 155 may be a licensed band or an unlicensed band. Typically, in an unlicensed band un-registered devices can gain access. Sometimes, in a licensed band a repository may keep track of all eligible subscribers; differently in an unlicensed band such a database of eligible subscribers may not exist. Different operators may access the unlicensed band. E.g., the spectrum occupied by the resource mapping 155 may be at least partially above 6 GHz, preferably at least partially above 15 GHz, more preferably at least partially above 30 GHz. Typically, with increasing frequencies, the aperture of an antenna decreases. Here, due to the well-defined directional transmission characteristics of the electromagnetic waves employed for the radar probing 109, a high spatial resolution may be achieved when determining the position of passive objects as part of the radar probing 109.

Typically, smaller apertures can be compensated by more antennas of an antenna array. This facilitates a higher angular resolution of the radar probing.

In some example, the transmission power employed for the data communication 108, on the one hand side, and the radar probing 109, on the other hand side, can be substantially different from each other. E.g., it might be possible to use a significantly higher transmission power during the second resource elements 161-163 than during the first resource elements 160. A higher transmission power used for the radar probe pulses by at least one of the BS. 112 and the terminal 130 can increase the accuracy of the radar probing 109. In other examples, it is possible that substantially the same transmission power is employed for the data communication 108 and the radar probing 109. E.g., the transmission power employed for the radar probing 109 is larger than the transmission power employed for the data communication 108 by a factor of at least 5, preferably by a factor of at least 50, more preferably by a factor of at least 100. E.g., it is possible that in cell edge scenarios, substantially the maximum hardware-supported transmission power of the respective radio transceiver is employed for, both, the radar probing 109 and the data communication 108.

An example is given: at cell edge max power for continuous communication may be limited by regulations for this scenario, e.g., to approximately 20 dBm. For a small transmission distance the power may be very low, e.g., in the order of −20 dBm. The radar probing is implemented based on a few pulses; here, higher transmission power may be implemented, e.g., amounting to 30 dBm or perhaps 20 dBm. Thus, varying ratios between the transmission power for data transmission and radar proving are possible.

Figure 3:
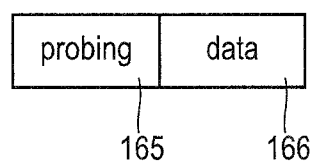
FIG. 3 schematically illustrates a radar probe pulse according to various embodiments.

FIG. 3 illustrates aspects with respect to a radar probe pulse 171 transmitted and/or received during one of the second resource elements 161-163; e.g., a duration of one of the second resource elements 161-163 may amount to 100 µs. The radar probe pulse 171 comprises a probing pulse section 165. Optionally, the radar probe pulse 171 may comprise a data section 166 encoding data that can help to implement the radar probing 109.

E.g., the probing pulse section 165 may comprise a waveform having spectral contributions arranged within the frequency associated with the respective second resource element 161-163. E.g., a duration of the probing pulse section 165 may be in the range of 0.1-2 µs, preferably in the range of 0.8-1.2 µs. An amplitude of the waveform may be modulated; this is sometimes referred to as an envelope. The envelope may have a rectangular shape, a sinc-function shape, or any other functional dependency depending on the implementation. The duration of the probing pulse section 165 is sometimes referred to as pulse width. The pulse width may be shorter than the duration of the respective second resource element 161-163 to enable reception of an echo of the radar probe pulse 171 during the duration of the respective second resource element 161-163, taking into account time of travel.

The optional data section 166 may include additional information which is suited to facilitate the radar probing 109. Such information may comprise: information on the radar transmitter, such as an identity; position; cell identity; virtual cell identity; etc.; and/or information on the radar probe pulse 171 itself such as a time of transmission; directional transmission profile; etc. Such information may be, generally, included explicitly or implicitly. E.g., for implicit inclusion of respective information, a lookup scheme communicated via the control channel 106 implemented on the radio channel 101 may be employed to enable inclusion of compressed flags.

While in the example of FIG. 3 such information is included in the data section 166 of the radar probe pulse 171 itself, in other examples it is also possible that such information is communicated separately from the radar probe pulse 171, e.g., in a control message communicated on the control channel 106 in one of the first resource elements 160. Here, cross-reference between the control message and the radar probe pulse 171 may be achieved, e.g., a unique temporal arrangement of the radar probe pulse 171 and the control message or inclusion of a characteristic identifier in the control message and the radar probe pulse 171.

Figure 4:
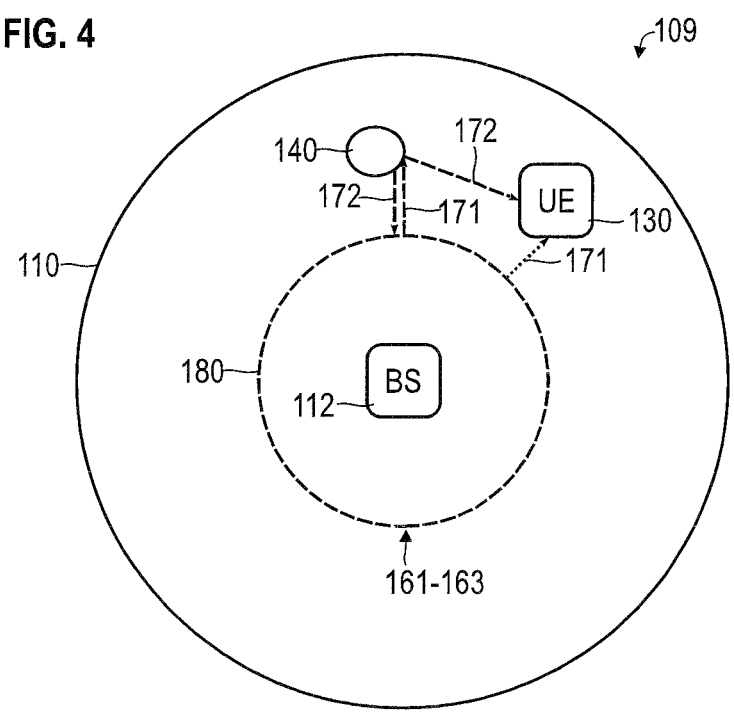
FIG. 4 schematically illustrates devices connected to a cellular network participating in a radar probing according to various embodiments.

FIG. 4 schematically illustrates an example of the radar probing 109. Here, the BS 112 is the radar transmitter. The BS 112 thus transmits radar probe pulses 171 in the second resource elements 161-163. The BS 112 implements a cell 110 of the cellular network. The cell 110 extends around the BS 112.

The radar probe pulses 171, in the example of FIG. 4, have isotropic directional transmission profiles 180, i.e., have substantially the same amplitude for various orientations of transmission with respect to the BS 112 (schematically illustrated by the dashed circle in FIG. 4). Thus, an amplitude or phase of the radar probe pulses does not show a significant dependency on the transmission direction.

The radar probe pulses 171 can travel along a LOS from the BS 112 to the terminal 130 (dotted arrow in FIG. 4). The radar probe pulses 171 are also reflected by a passive object 140, e.g., an obstacle, a car, a plant, a house, a car, a person, a wall, a 3-D object, a channel, are cave, etc. The passive object 140 is not required to have communication capability. Thus, the passive objection 140 may not be configured to communicate on the radio channel 101, 105, 106. Due to the reflection at the passive object 140, echoes 172 of the radar probe pulses 171 are created. These echoes 172 may be received by the terminal 130 and/or the BS 112, as indicated in FIG. 4 by the respective arrows.

In some examples, a direction of the echoes 172 and/or a phase shift of the echoes 172 may be characteristic of the position or shape of the object 140. A Doppler shift of the echoes 172 may be characteristic of the velocity of the object 140.

FIG. 5A is a signaling diagram of communication between the BS 112 and the terminal 130. The communication illustrated in the example of FIG. 5A facilitates the radar probing 109.

First, at 1001, the radio channel 101 is established between the BS 112 and the terminal 130. Here, an attachment procedure can be executed. Subsequently, the terminal 130 may be operated in connected mode.

In the connected mode, a scheduling grant 1001A can be communicated via the control channel 106, e.g., from the BS 112 to the terminal 130. The scheduling grant 1001A can be indicative of at least one of the second resource elements 161-163. The scheduling grant 1001A can be used in order to preemptively announce the radar probing 109, i.e., the transmission of a radar probe pulse 171. Here, the BS 112 may act as a central scheduler for the second resource elements 161-163, avoiding interference to the data communication 108.

If the scheduling grant 1001A is indicative of a single one of the second resource elements 161-163, the scheduling grant may also be referred to as a dedicated scheduling grant—i.e., dedicated to the specific second resource element 161-163 for which it is indicative. The dedicated scheduling grant may be communicated on request/on demand. Per dedicated scheduling grant, a predefined and limited number of radar probe pulses 171 may be transmitted, e.g., a single radar probe pulse 171. Thereby, tailored radar probing 109 can be achieved.

If, however, the scheduling grant 1001A is indicative of a plurality of second resource elements 161-163, the scheduling grant can be referred to as a persistent scheduling grant. In detail, the scheduling grant may be indicative of a certain timing pattern or repetition rate of the second resource elements 161-163. E.g., the persistent scheduling grant could be indicative of the repetition rate 151, the duration 152, etc. Until further notice, the second resource elements 161-163 may then be persistently scheduled. Here, a non-predefined or undefined number of radar probe pulses 171 may be transmitted per persistent scheduling grant. Thereby, reduced overhead on the radio channel 101 can be achieved.

In some examples, the scheduling grant 1001A can be communicated in a unicast transmission from the BS 112 to the terminal 130 and optionally in further unicast transmissions to other affected devices connected to the network. In other examples, the scheduling grant 1001A can be broadcasted on the radio channel 101; thereby, one or more further devices communicating on the radio channel 101 can be prompted to mute transmission of data in the at least one resource element indicated by the scheduling grant 1001A. Thereby, interference can be effectively mitigated for a plurality of devices connected to the network.

Then, at 1002, transmission of the radar probe pulse 171 is effected. In the example of FIG. 5A, the BS 112 transmits the radar probe pulse 171. In the example of FIG. 5A, an echo 172 of the radar probe pulse 171 is received by the terminal 130.

In the example of FIG. 5A, the terminal 130 evaluates the reception of the radar probe pulse 171 to some degree. In detail, the terminal analyzes the raw receive data and determines certain receive properties of the echo 172, e.g.: angle of arrival; time-of-flight; Doppler shift; and/or receive power level.

The terminal then sends a report message 1003 to the BS 112. The report message is indicative of the determined one or more receive properties of the echo 172. Optionally, the report message 1003 is indicative of a position of the terminal 130. Based on the one or more receive properties—and optionally the position of the terminal 130, if not otherwise known to the BS 112—, the BS 112 can then determine the position and/or velocity of the passive object associated with the echo 172. In detail, where the absolute or relative position of the terminal 130—e.g., with respect to the BS 112—is known, it is possible to conclude back on the position of the passive object 140, e.g., by means of triangulation, etc. Similar considerations apply with respect to the direction of movement of the passive object 140.

FIG. 5B is a signaling diagram of communication between the BS 112 and the terminal 130. The example of FIG. 5B generally corresponds to the example of FIG. 5A. However, in the example of FIG. 5B, further processing as part of the radar probing 109 is performed at the terminal 130. In particular, the terminal 130 already evaluates one or more receive properties of the echo 172 to determine the relative or absolute position of the object 140. This position and/or velocity is included in the report message 1004.

In the various examples, the amount of logic residing at the terminal 130—and, generally, the radar receiver—may vary. In one example, raw information on the received echo 172 is reported to the radar transmitter—e.g., the BS 112. In other examples, some processing of the raw information is performed, e.g., as in the example of FIG. 5A, to determine one or more receive properties and/or to compress the raw information. In other examples, it is even possible to determine the position of the object 140 from which the echo 172 originates. Then, this position can be reported to the radar transmitter—e.g., the BS 112.

While above various examples have been described with respect to radar probe pulses 171 having an isotropic directional transmission profile 180, it is also possible that the radar probe pulses 171 have an anisotropic directional transmission profiles.

While above various examples have been described with respect to a scenario where the BS 112 is the radar transmitter, in other examples it is also possible that the terminal 130 implements the radar transmitter 130. Here, the resource mapping 155 may be centrally scheduled by the BS 112. I.e., it is possible that the BS 112 informs the terminal 130 on the occurrence of the second resource elements 161-163. It is possible that the BS 112 controls the resource allocation for the radar proving. If the terminal 130 implements the radar transmitter, the terminal 130 and/or the BS 112 may receive radar probe pulses.

Figure 6:
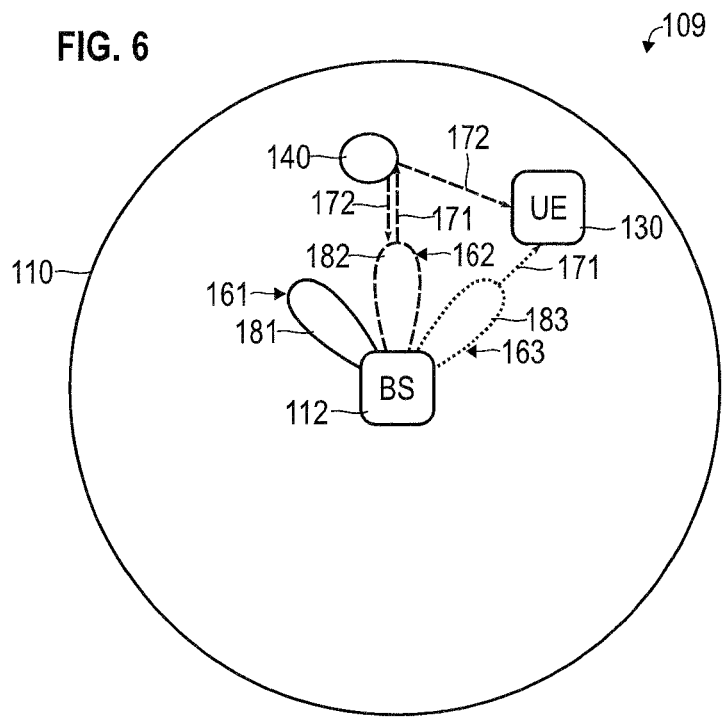
FIG. 6 schematically illustrates devices connected to a cellular network participating in a radar probing according to various embodiments, wherein the corresponding radar probe pulses have anisotropic directional transmission profiles.

FIG. 6 schematically illustrates an example of radar probing 109 where the employed radar probe pulses 171 have anisotropic directional transmission profiles 181-183. The anisotropic directional transmission profiles 181-183 are associated with a dependency of the amplitude of the respective radar probe pulses 171 with respect to an orientation against the radar transmitter, in the example of FIG. 6 with respect to the BS 112. In the example of FIG. 6, the anisotropic direction transmission profiles 181-183 are implemented by corresponding pencil beams, but generally other shapes are conceivable. The anisotropic directional transmission profiles 181-183 may be employed based on techniques of beamforming. For beamforming, amplitude and phase antennas of an antenna array are varied according to certain antenna weights. Thereby, constructive and destructive interference may be achieved for different directions with respect to the transmitter. This results in the anisotropic direction transmission profile 181-183.

As illustrated in FIG. 6, a plurality of different anisotropic directional transmission profiles 182 is implemented for different radar probe pulses 171. In particular, the different anisotropic directional transmission profiles 181-183 are associated with radar probe pulses 171 transmitted during different ones of the second resource elements 161-163. In the example of FIG. 6, only three anisotropic directional transmission profiles 181-183 are illustrated for sake of simplicity; in general, a plurality of anisotropic directional transmission profiles 181-183 may be employed, e.g., to cover the entire surrounding of the radar transmitter.

In the example FIG. 6, the anisotropic directional transmission profiles 182 are implemented as pencil beams. Generally, pencil beams implementing the profiles 181-183 may have an opening angle of less than 90°, preferably of less than 45°, more preferably of less than 20°. By implementing well-defined or narrow anisotropic directional transmission profiles 181-183, e.g., in the form of pencil beams as illustrated in FIG. 6, a high spatial resolution of the radar probing 109 can be achieved. This is apparent from FIG. 6 where the radar probe pulse 171 of the profile 182 is reflected by the passive object 140; the respective echoes 172 are being received by, both, the BS 112, as well as the terminal 130. On the other hand, the radar probe pulse 171 of the profile 183 is not reflected by the passive object 140, because it is positioned outside the profile 183.

The anisotropic directional transmission profiles 182 can also be employed in order to mitigate interference. E.g., it is possible to determine the anisotropic directional transmission profiles 181-183 of at least some of the radar probe pulses 171 based on a position of the radar transmitter and/or a position of the radar receiver and/or the position of at least one further device communicating on the radio channel 101 such as further terminals. E.g., in the example of FIG. 6, it would be possible to employ radar probing 109 based on the anisotropic directional transmission profile 182 in the second resource element 162; and, reuse the second resource element 162 for data communication 108 with the terminal 130. In such an example, the anisotropic directional transmission profile 182 of the respective radar profiles 171 is determined to avoid transmission into the direction of the terminal 130. This is sometimes referred to as spatial diversity.

Figure 7:
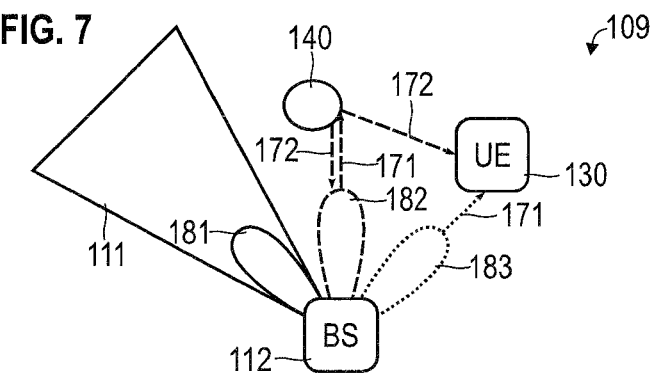
FIG. 7 schematically illustrates devices connected to a cellular network participating in a radar probing according to various embodiments, wherein the corresponding radar probe pulses have anisotropic directional transmission profiles and wherein the anisotropic directional transmission profiles correspond to virtual cells of the cellular network.

FIG. 7 schematically illustrates an example of radar probing 109 where the employed radar probe pulses 171 have anisotropic directional transmission profiles 181-183. FIG. 7 generally corresponds to the example of FIG. 6. However, in the example of FIG. 7, the different anisotropic directional transmission profiles 181-183 are associated with different virtual cells 111 of the BS 112 (in FIG. 7 only the virtual cell 111 associated with the anisotropic directional transmission profile 181 is illustrated for sake of simplicity). The various virtual cells 111 may be associated with different cell identifiers and may, hence, employ different resource mappings 155 in some examples. Pilot signals communicated in the different virtual cells 111 may be orthogonal to each other. The virtual cells 111 may facilitate spatial diversity of the data communication 108. In some examples, it is possible that the virtual cells 111 are associated with one or more than one BS (not shown in FIG. 7).

Figure 8:
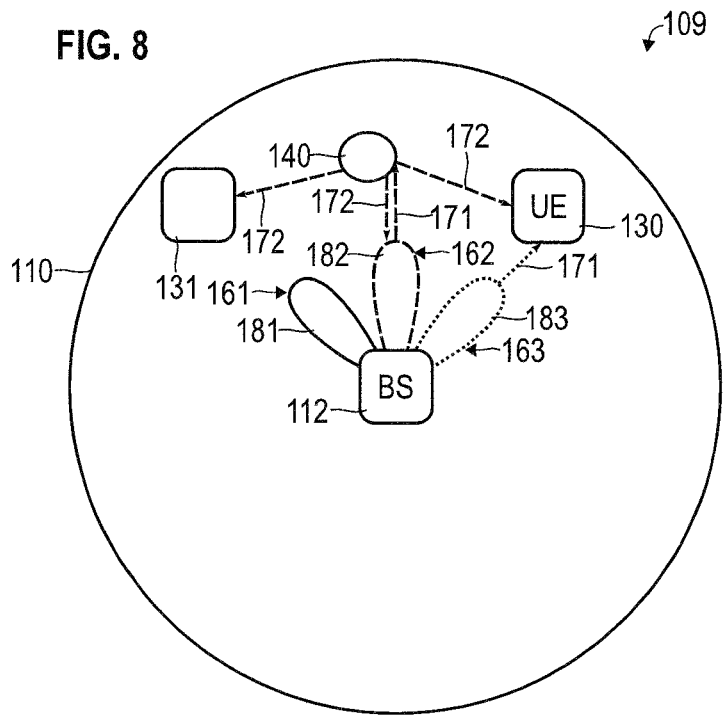
FIG. 8 schematically illustrates devices connected to a cellular network participating in a radar probing according to various embodiments, wherein the radar probe pulses have anisotropic directional transmission profiles.

FIG. 8 schematically illustrates an example of the radar probing 109 where the employed radar probe pulses 171 have anisotropic directional transmission profiles 181-183. Here, more than two devices—in the example of FIG. 8, the terminals 130, 131 and the BS 112—may participate in the radar probing 109. In the present example, the BS 112 is the radar transmitter. It is possible that the BS 112 fuses information received from the terminals 130, 131 when determining the position and the velocity of the object 140. For this, the BS 112 may receive report messages 1003, 1004 from each one of the terminals 130, 131. Additionally, the BS 112 may take into consideration the echo 172 directly received by the BS 112 when determining the position at the velocity of the object 140. The terminals 130, 131 implement (passive) radar receivers. By taking into account a plurality of sources of information regarding the radar probing 109, the accuracy in determining the position and the velocity of the object 140 as part of the radar probing 109 can be increased.

Figure 9:
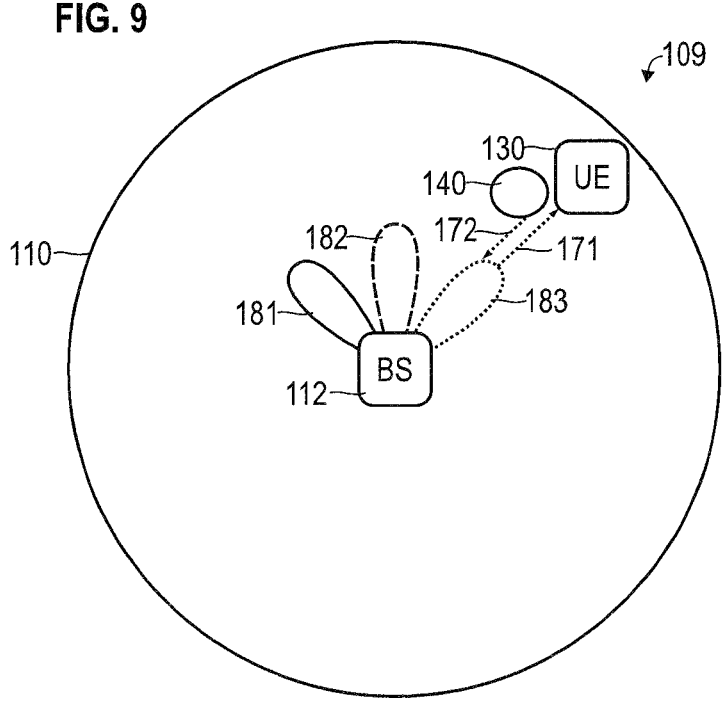
FIG. 9 schematically illustrates devices connected to a cellular network participating in a radar probing according to various embodiments, wherein the radar probe pulses have anisotropic directional transmission profiles.

FIG. 9 schematically illustrates an example of the radar probing 109 where the employed radar probe pulses 171 have anisotropic directional transmission profiles 181-183. In the example of FIG. 9, it is illustrated that the radar probe pulse 171 may be received by the terminal 130 in a LOS transmission; while the respective echo 172 is reflected back to the BS 112 (and optionally also to the terminal 130; not illustrated in FIG. 9).

Figure 10:
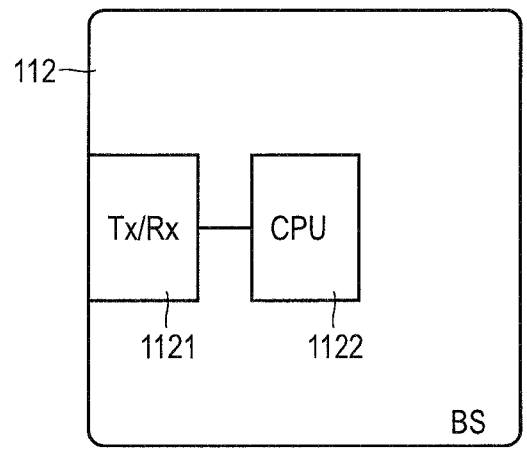
FIG. 10 is a schematic illustration of a base station of a cellular network configured to implement techniques of coexistence of data communication and radar probing according to various embodiments.

FIG. 10 is a schematic illustration of the BS 112. The BS comprises a processor 1122, e.g., a multicore processor. The BS 112 further comprises a radio transceiver 1121. The radio transceiver 1121 is configured to communicate on the radio channel 101, e.g., by transmitting and receiving (transceiving). Furthermore, the radio transceiver 1121 is configured to transmit and/or receive radar probe pulses 171. The processor 1122 can be configured to perform techniques as described herein with respect to coexistence of data transmission 108 and radar probing 109. For this, a non-volatile memory may be provided which stores respective control instructions.

Figure 11:
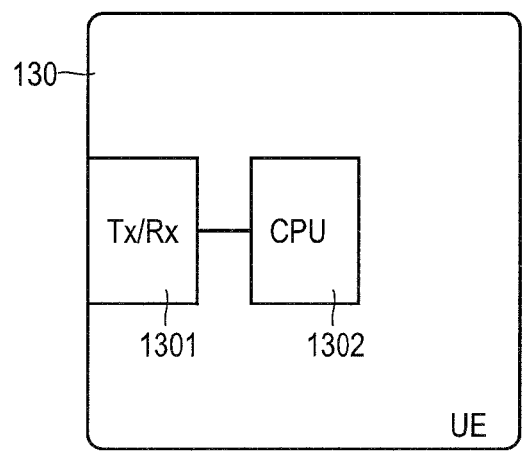
FIG. 11 is a schematic illustration of a terminal of a cellular network configured to implement techniques of coexistence of data communication and radar probing according to various embodiments.

FIG. 11 is a schematic illustration of the terminal 130. The terminal 130 comprises a processor 1302, e.g., a multicore processor. The terminal 130 further comprises a radio transceiver 1301. The radio transceiver 1301 is configured to communicate on the radio channel 101, e.g., by transceiving. Furthermore, the radio transceiver 1301 is configured to transmit and/or receive radar probe pulses 171. The processor 1302 can be configured to perform techniques as described herein with respect to coexistence of data transmission 108 and radar probing 109. For this, a non-volatile memory may be provided which stores respective control instructions.

Figure 12:
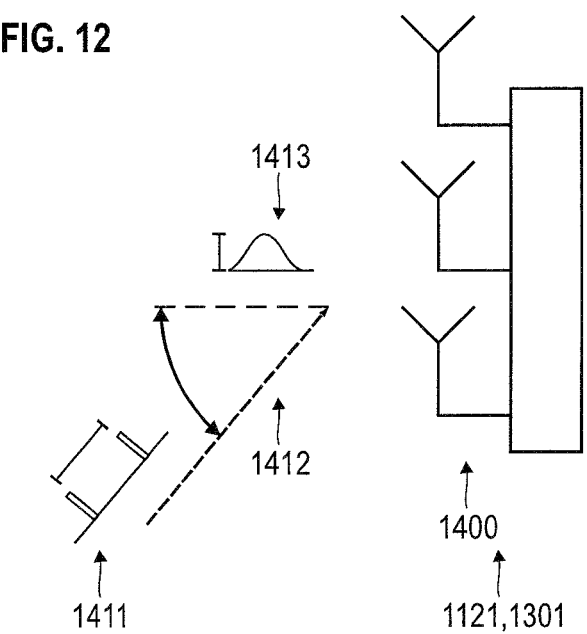
FIG. 12 schematically illustrates receive properties of radar probe pulses received by an antenna array of a radio transceiver according to various embodiments.

FIG. 12 schematically illustrates the transceivers 1121, 1301 in greater detail. The transceivers 1121, 1301 comprise an antenna array 1400 in the illustrated example. Based on the antenna array 1400, it is possible to employ an anisotropic sensitivity profile during reception, e.g., of an echo 172 of a radar probe pulse 171. E.g., in some examples, it is possible that the accuracy of the radar probing 109 is further increased by employing an anisotropic sensitivity profile of the antenna array 1400 of the radio transceiver 1121, 1301. Such anisotropic sensitivity profile of the antenna array 1400 may be combined with an isotropic directional transmission profile 180 or and anisotropic directional transmission profile 181-183 of the respective radar probe pulse 171.

The example of FIG. 12, the transceivers 1121, 1301 comprise a single antenna array 1400. In further examples, it is possible that the transceivers 1121, 1301 comprise a plurality of antenna arrays 1400. The plurality of antenna arrays 1400 may be oriented differently to cover different directions with respect to the respective device. Omnidirectional coverage can be provided.

FIG. 12 furthermore schematically illustrates receive properties such as the receive power level 1413; the angle of arrival 1412; and the time-of-flight 1411. Further receive properties of interest regarding the radar probing 109 include the Doppler shift which may be used in order to determine a velocity of the object 140, e.g., the radial velocity from/to the radar transmitter and/or radar receiver. E.g., the angle of arrival 1412 may be determined in absolute terms, e.g., with respect to a magnetic North direction provided by a separate compass (not illustrated in FIG. 12), etc. It is also possible that the angle of arrival 1412 is determined in relative terms, e.g., with respect to a characteristic direction of the antenna array 1400. Depending on the definition of the angle of arrival 1412 and/or the further receive properties, corresponding information may be included in a respective report message 1003. A further receive property is the phase shift, e.g., with respect to an arbitrary reference phase or a reference phase defined with respect to a line-of-sight transmission.

Figure 13:
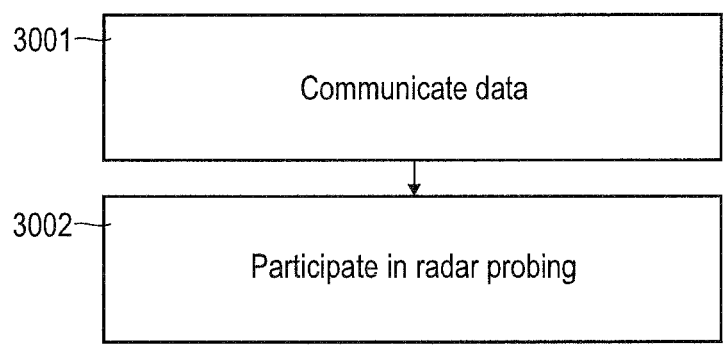
FIG. 13 is a flowchart of a method according to various embodiments.

FIG. 13 is a flowchart of a method according to various embodiments. E.g., the method of FIG. 13 may be executed by the processor 1122 of the BS 112 and/or by the processor 1302 of the terminal 130.

First, at 3001, data communication 108 is executed. For this, packetized data may be transmitted and/or received on the radio channel 111 in the first resource elements 160. Typically, the data communication 108 may be executed based on LOS transmission.

Figure 14:
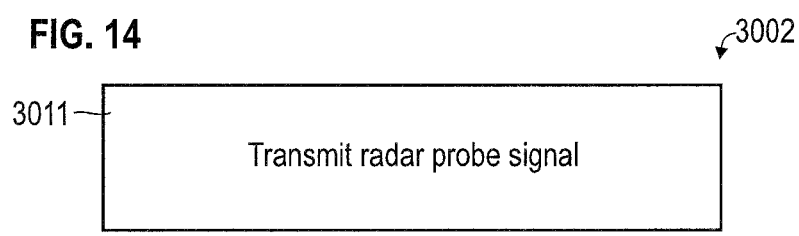
FIG. 14 is a flowchart of a method according to various embodiments.
Figure 15:
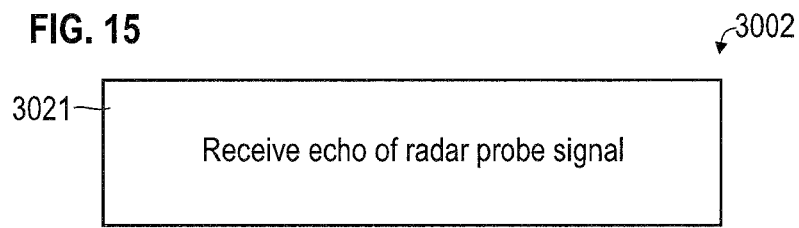
FIG. 15 is a flowchart of a method according to various embodiments.

Second, at 3002, participation in the radar probing 109 is executed. Typically, the radar probing 109 may be executed based on non-LOS transmission, i.e., based on echoes. 3002 may comprise one or more of the following: transmitting a radar probe pulse 171 (cf. FIG. 14: 3011) in the second resource elements 161-163; receiving an echo 172 of a radar probe pulse 171 (cf. FIG. 15: 3021) in the second resource elements 161-163; determining at least one of a position in the velocity of a passive object based on at least one receive property 1411-1413 of the radar probe pulse 171; determining the at least one receive property 1411-1413 from an a received echo 172; receiving a control message 1003 indicating at least one of the at least one receive property 1411-1413, a position, and a velocity of a radar receiver.

Summarizing, above, techniques have been illustrated which enable to re-use properties of electromagnetic waves at higher frequencies not only for data communication, but also for radar probing. Radar probing typically includes measuring delay profiles and angle of arrivals for different reflection/echoes of radar probe pulses.

In some examples, techniques of implementing a communication protocol have been described where resource elements such as timeslots are allocated/dedicated to the radar probing. In some examples, respective resource elements may be centrally scheduled by the BS.

Such techniques enable to reuse the same hardware for the data communication and the radar probing. Thus, it is possible to save cost, size, identification and simplify interference mitigation, both, on the system-level and for each terminal.

The resource elements for the radar probing can be used in licensed and unlicensed bands. Typically, the respective spectrum can be above 6 GHz for a high spatial resolution of the obtained radar pictures. By the techniques, it is thus possible to employ radar probing in handset devices in combination with data communication in overlapping frequency bands. The frequency bands of interest can range between 30-100 GHz. License free bands can be employed. License free bands are typically specified that anyone can access the respective band, possibly with some set of regulations in terms of output power, duty cycle, etc. In such a scenario of an unlicensed band, techniques of interference mitigation as described herein become particularly relevant.

The techniques described herein are based on the finding that, both, radar probing and data communication may be supported by a small, e.g. handheld, device. Based on this finding, the techniques are provided which enable integration of data communication capability and radar probing capability into the same hardware. The different protocols used for data communication and radar probing may be software defined.

To avoid interference, when performing data communication, radar probing may be sanctioned—and vice versa. Thus, respective resource elements for radar probing may be scheduled occasionally, repeatedly, and/or on request. If the radar transmitter has knowledge on the direction of certain further devices, radar probing can be employed simultaneously with data communication with the further devices by relying on spatial diversity.

Although the invention has been shown and described with respect to certain preferred examples, equivalents and modifications will occur to others skilled in the art upon the reading and understanding of the specification. The present invention includes all such equivalents and modifications and is limited only by the scope of the appended claims.

E.g., while above various examples have been described with respect to radar probe pulses transmitted by the BS, respective techniques may be readily implemented with respect to radar probe pulses transmitted by the terminal. The techniques described herein can be applicable to device-to-device channels, sometimes referred to as sidelink communication. A specific example of device-to-device channels comprises vehicle-to-vehicle communication.

The invention claimed is:

1. A base station device responsible for scheduling resources for a plurality of terminal devices on a cellular network, comprising:
   a radio transceiver, and
   at least one processor configured to communicate, via the radio transceiver, data on a radio channel employing first resource elements of the radio channel,
   wherein the at least one processor is further configured to control the radio transceiver to participate in a radar probing employing second resource elements of the radio channel, the second resource elements being orthogonal to the first resource elements, and
   wherein the at least one processor is configured to communicate, via the radio transceiver and on the radio channel, a scheduling grant indicative of at least one of the second resources elements.

2. The device of claim 1,
   wherein the at least one processor is configured to control the radio transceiver to mute transmission of the data in the second resource elements.

3. The device of claim 1,
   wherein the at least one processor is configured to control the radio transceiver to transmit radar probe pulses.

4. The device of claim 3,
   wherein the at least one processor is configured to control the radio transceiver to transmit the radar probe pulses at a first transmission power and to transmit the data at a second transmission power,
   wherein the first transmission power is larger than the second transmission power by a factor of at least 5, preferably by a factor of at least 50, more preferably by a factor of at least 100.

5. The device of claim 3,
   wherein at least some of the radar probe pulses have anisotropic directional transmission profiles.

6. The device of claim 5,
   wherein the at least one processor is configured to determine the anisotropic directional transmission profiles of the at least some of the radar probe pulses based on a position of the device and a position of at least one further device communicating on the radio channel.

7. The device of claim 1,
   wherein the at least one processor is configured to control the radio transceiver to receive echoes of radar probe pulses reflected from passive objects.

8. The device of claim 7,
   wherein the at least one processor is configured to control the radio transceiver to receive the echoes of the radar probe pulses employing an anisotropic sensitivity profile of at least one antenna array of the radio transceiver.

9. The device claim 3,
   wherein the at least one processor is configured to determine at least one of a position and a velocity of a passive object based on at least one receive property of echoes of the radar probe pulses as part of the radar probing, wherein the position is optionally defined as a distance from the device.

10. The device of claim 9,
    wherein the at least one receive property is selected from the group comprising: relative or absolute angle of arrival; time of flight; Doppler shift; phase shift; and receive power level.

11. The device of claim 1,
    wherein the scheduling grant is a persistent scheduling grant or a dedicated scheduling grant.

12. The device claim 1,
    wherein the scheduling grant is broadcasted on the radio channel.

13. The device of claim 12,
    wherein the scheduling grant prompts at least one further device communicating on the radio channel to mute transmission of data in the at least one of the second resource elements.

14. The device of claim 1,
    wherein the second resource elements are arranged in an intermittent sequence,
    wherein an average repetition rate of individual elements of the sequence of the second resource elements is larger than 0.5 seconds, preferably larger than 0.8 second.

15. The device claim 1,
    wherein the second resource elements are arranged in an intermittent sequence,
    wherein an average duration of individual elements of the sequence of the second resource elements is shorter than 2 µs, preferably shorter than 0.8 µs, more preferably shorter than 0.1 µs.

16. The device of claim 1,
    wherein the first resource elements and the second resource elements are arranged in a spectrum being a licensed band or an unlicensed band and being preferably at least partially above 6 GHz, more preferably above 30 GHz.

17. A method, comprising:

communicating data on a radio channel employing first resource elements of the radio channel;

participating in a radar probing employing second resource elements orthogonal to the first resource elements;

scheduling resources, via a base station device, for a plurality of terminal devices on a cellular network; and communicating, via a radio receiver and on the radio channel, a scheduling grant indicative of at least one of the second resource elements.

* * * * *